(12) United States Patent
Lee et al.

(10) Patent No.: US 9,274,382 B2
(45) Date of Patent: Mar. 1, 2016

(54) DISPLAY DEVICE AND MANUFACTURING METHOD THEREOF

(71) Applicant: Samsung Display Co., Ltd., Yongin, Gyeonggi-do (KR)

(72) Inventors: Soo Jung Lee, Yongin (KR); Yeun Tae Kim, Yongin (KR); Hee-Keun Lee, Yongin (KR); Sung Jun Kim, Yongin (KR); Sung Woo Cho, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/060,882

(22) Filed: Oct. 23, 2013

(65) Prior Publication Data

US 2014/0354912 A1 Dec. 4, 2014

(30) Foreign Application Priority Data

May 30, 2013 (KR) ........................ 10-2013-0061977

(51) Int. Cl.
  *G02F 1/1341* (2006.01)
  *G02F 1/1333* (2006.01)
(52) U.S. Cl.
  CPC ........ *G02F 1/1341* (2013.01); *G02F 1/133377* (2013.01)
(58) Field of Classification Search
  CPC  G02F 1/133377; G02F 1/1341; G02F 1/1339
  See application file for complete search history.

(56) References Cited

U.S. PATENT DOCUMENTS

| 6,198,217 B1 | 3/2001 | Suzuki et al. | |
| 6,469,761 B1* | 10/2002 | Drabik et al. | 349/122 |
| 2010/0014011 A1 | 1/2010 | Mottram et al. | |
| 2012/0062448 A1* | 3/2012 | Kim et al. | 345/55 |

FOREIGN PATENT DOCUMENTS

| JP | 2008-033117 | 2/2008 |
| JP | 2008-242031 | 10/2008 |
| KR | 10-2001-0005935 | 1/2001 |
| KR | 10-2002-0047748 | 6/2002 |
| KR | 10-2005-0013318 | 2/2005 |
| KR | 10-2008-0049193 | 6/2008 |
| KR | 10-2012-0026880 | 3/2012 |
| KR | 10-2013-0042307 | 4/2013 |

* cited by examiner

*Primary Examiner* — Dennis Y Kim
(74) *Attorney, Agent, or Firm* — Knobbe Martens Olson & Bear LLP

(57) ABSTRACT

A display device includes: a substrate including a plurality of pixel areas; a thin film transistor formed on the substrate; a pixel electrode connected to the thin film transistor and formed in at least one of the plurality of pixel areas; a roof layer formed on the pixel electrode to be spaced apart from the pixel electrode by a microcavity therebetween; an injection hole formed on the roof layer so as to expose a part of the microcavity; a liquid crystal layer configured to fill the microcavity; at least one support member adjacent to the injection hole and formed in a column shape in the microcavity; and an encapsulation layer formed on the roof layer so as to cover the injection hole to seal the microcavity.

16 Claims, 22 Drawing Sheets

DISPLAY DEVICE AND MANUFACTURING METHOD THEREOF

CROSS-REFERENCE TO RELATED APPLICATIONS

This application claims priority to and the benefit of Korean Patent Application No. 10-2013-0061977 filed in the Korean Intellectual Property Office on May 30, 2013, the entire contents of which are incorporated herein by reference.

BACKGROUND

1. Field

The present disclosure relates to a display device and a manufacturing method thereof capable of preventing deformation of a roof layer and improving an aperture ratio.

2. Description of the Related Technology

A liquid crystal display which is a common type of flat panel display currently in use, generally includes two sheets of display panels with field generating electrodes such as a pixel electrode, a common electrode, and the like, and a liquid crystal layer interposed therebetween. The liquid crystal display generates an electric field in the liquid crystal layer by applying a voltage to the field generating electrodes to determine alignment of liquid crystal molecules of the liquid crystal layer through the generated electric field, and to control polarization of incident light, thereby displaying images.

Two sheets of display panels configuring the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like, may be formed. In the opposing display panel, a light blocking member, a color filter, a common electrode, and the like may be formed. In some cases, the light blocking member, the color filter, and the common electrode may be formed on the thin film transistor array panel.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

Embodiments of the present invention have been made in an effort to provide a display device and a manufacturing method thereof having advantages of reducing a weight, a thickness, cost, and a processing time by manufacturing the display device by using one substrate.

Further, embodiments of the present invention have been made in an effort to provide a display device and a manufacturing method thereof having advantages of preventing deformation of a roof layer and improving an aperture ratio.

One embodiment of the present invention provides a display device, including: a substrate including a plurality of pixel areas; a thin film transistor formed on the substrate; a pixel electrode connected to the thin film transistor and formed in at least on of the plurality of pixel areas; a roof layer formed on the pixel electrode to be spaced apart from the pixel electrode by a microcavity therebetween; an injection hole formed on the roof layer so as to expose a part of the microcavity; a liquid crystal layer configured to fill the microcavity; at least one support member adjacent to the injection hole and formed in a column shape in the microcavity; and an encapsulation layer formed on the roof layer so as to cover the injection hole to seal the microcavity.

A cross section of the microcavity may be smaller as the microcavity approaches the injection hole.

A distance between the at least one support member and a side wall of the roof layer may be smaller as the at least one support member approaches the injection hole.

A plurality of the support members may be adjacent to the injection hole.

A distance between the plurality of adjacent support members may be smaller as the plurality of adjacent support members approaches the injection hole.

A width of the at least one support member may be larger as the at least one support member approaches the injection hole.

The at least one support member may be shaped as a triangle, a trapezoid, a T-lettered shape, a semicircle, a semioval, or a pentagon.

The at least one support member may be overlapped with the pixel electrode.

The display device may further include an insulating layer formed between the at least one support member and the pixel electrode.

The at least one support member may not be overlapped with the pixel electrode.

The display device may further include a light blocking member formed on the substrate to be overlapped with a boundary of the pixel area, the thin film transistor, and the at least one support member.

A height of the microcavity may be smaller as the microcavity approaches the injection hole.

Another embodiment of the present invention provides a manufacturing method of a display device, including: forming a thin film transistor on a substrate, the substrate including a plurality of pixel areas; forming a pixel electrode connected to the thin film transistor in at least one of the plurality of pixel areas; forming a sacrificial layer on the pixel electrode; forming an opening in the sacrificial layer by removing at least a part of the sacrificial layer; forming a roof layer on the sacrificial layer and forming a support member in the opening; forming an injection hole by patterning the roof layer to expose at least a part of the sacrificial layer; forming a microcavity between the pixel electrode and the roof layer by removing the sacrificial layer; forming a liquid crystal layer in the microcavity by injecting a liquid crystal material through the injection hole; and forming an encapsulation layer on the roof layer to seal the microcavity.

The at least one pixel area may be disposed in a matrix form including a plurality of pixel rows and a plurality of pixel columns, the sacrificial layer positioned between the plurality of pixel columns may be removed, and the roof layer may be formed between the plurality of pixel columns to cover a side surface of the microcavity.

A support member may be made of a same material as the roof layer.

A support member may be adjacent to the injection hole to be formed in a column shape.

A cross section of the microcavity may be smaller as the microcavity approaches the injection hole.

A distance between the support member and a side wall of the roof layer may be smaller as the support member approaches the injection hole.

A plurality of support members may be adjacent to one injection hole, and a distance between the plurality of adjacent support members may be smaller as the plurality of support members approaches the injection hole.

The support member may be shaped as a triangle, a trapezoid, a T-lettered shape, a semicircle, a semioval, or a pentagon.

The support member may be overlapped with the pixel electrode, and the manufacturing method may further include forming an insulating layer on the pixel electrode.

The support member may not be overlapped with the pixel electrode.

The manufacturing method may further include forming a light blocking member on the substrate, in which the light blocking member may be overlapped with a boundary of the pixel area, the thin film transistor, and the support member.

A height of the microcavity may be smaller as the microcavity approaches the injection hole.

As described above, the display device and the manufacturing method thereof according to embodiments of the present invention have the following effects.

In the display device and the manufacturing method thereof according to embodiments of the present invention, it is possible to reduce a weight, a thickness, cost, and a processing time by manufacturing the display device by using one substrate.

Further, it is possible to prevent deformation of a roof layer by forming a support member which is adjacent to an injection hole to support the roof layer.

Further, a distance between the support member and a side wall of the roof layer becomes smaller as it becomes closer to the injection hole, and as a result, it is possible to improve an aperture ratio.

DETAILED DESCRIPTION OF CERTAIN INVENTIVE EMBODIMENTS

Figure 1:
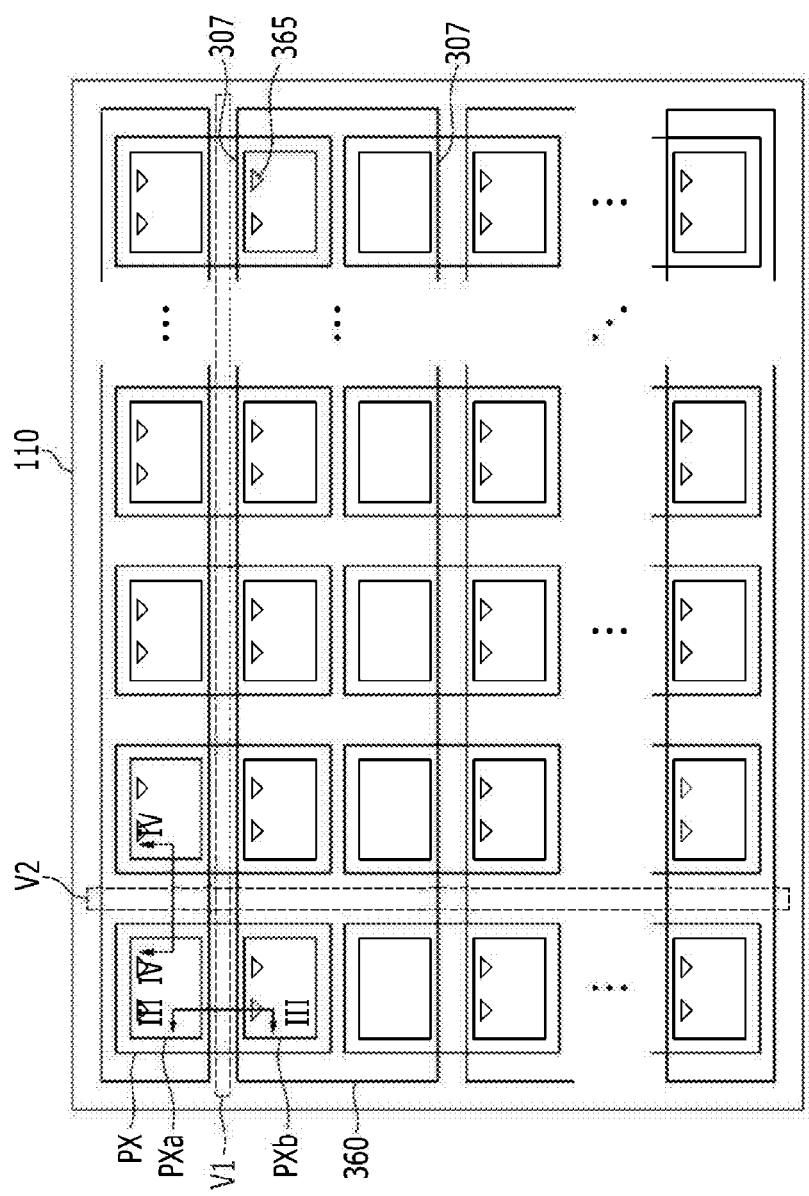
FIG. 1 is a plan view illustrating a display device according to an embodiment of the present invention.

The present invention will be described more fully hereinafter with reference to the accompanying drawings, in which certain embodiments of the invention are shown. As those skilled in the art would realize, the described embodiments may be modified in various ways, without departing from the spirit or scope of the present invention.

In the drawings, the thickness of layers, films, panels, regions, etc., may be exaggerated for clarity. Like reference numerals generally designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In a liquid crystal display in the related art, two sheets of substrates are typically used, and respective constituent elements are formed on the two sheets of substrates, and as a result, there may be problems in that the display device is heavy and thick, has high cost, and takes a long processing time.

A display device according to an embodiment of the present invention will be schematically described below with reference to the accompanying drawings.

FIG. 1 is a plan view illustrating a display device according to an embodiment of the present invention, and for convenience, FIG. 1 illustrates only some constituent elements.

A display device according to an embodiment of the present invention includes a substrate 110 made of a material such as glass or plastic, and a roof layer 360 formed on the substrate 110.

The substrate 110 includes a plurality of pixel areas PX. The plurality of pixel areas PX includes a plurality of pixel rows and a plurality of pixel columns to be disposed in a matrix form. Each pixel area PX may include a first subpixel area PXa and a second subpixel area PXb. The first subpixel area PXa and the second subpixel area PXb may be vertically disposed.

A first valley V1 is positioned between the first subpixel area PXa and the second subpixel area PXb in a pixel row direction, and a second valley V2 is positioned between a plurality of pixel columns.

The roof layer 360 may be formed along the plurality of pixel rows. In this case, the roof layer 360 is removed at the first valley V1 and thus an injection hole 307 is formed to expose a constituent element positioned below the roof layer 360 to the outside.

Each of the first subpixel area PXa and the second subpixel area PXb may include one injection hole 307. For example, the injection hole 307 is formed to correspond to a lower side of the first subpixel area PXa, the injection hole 307 is formed to correspond to an upper side of the second subpixel area PXb, and thus the two injection holes 307 face each other.

A support member 365 is formed to be adjacent to the injection hole 307 below the roof layer 360. A microcavity (not illustrated) is formed below the roof layer 360, and a phenomenon that the roof layer 360 sags downward at the injection hole 307 corresponding to an inlet of the microcavity may occur. Since the support member 365 is adjacent to the injection hole 307 to support the roof layer 360, a sagging phenomenon of the roof layer 360 around the injection hole 307 may be prevented.

Next, one pixel of the display device according to an embodiment of the present invention will be described below with reference to FIGS. 1 to 5.

Figure 2:
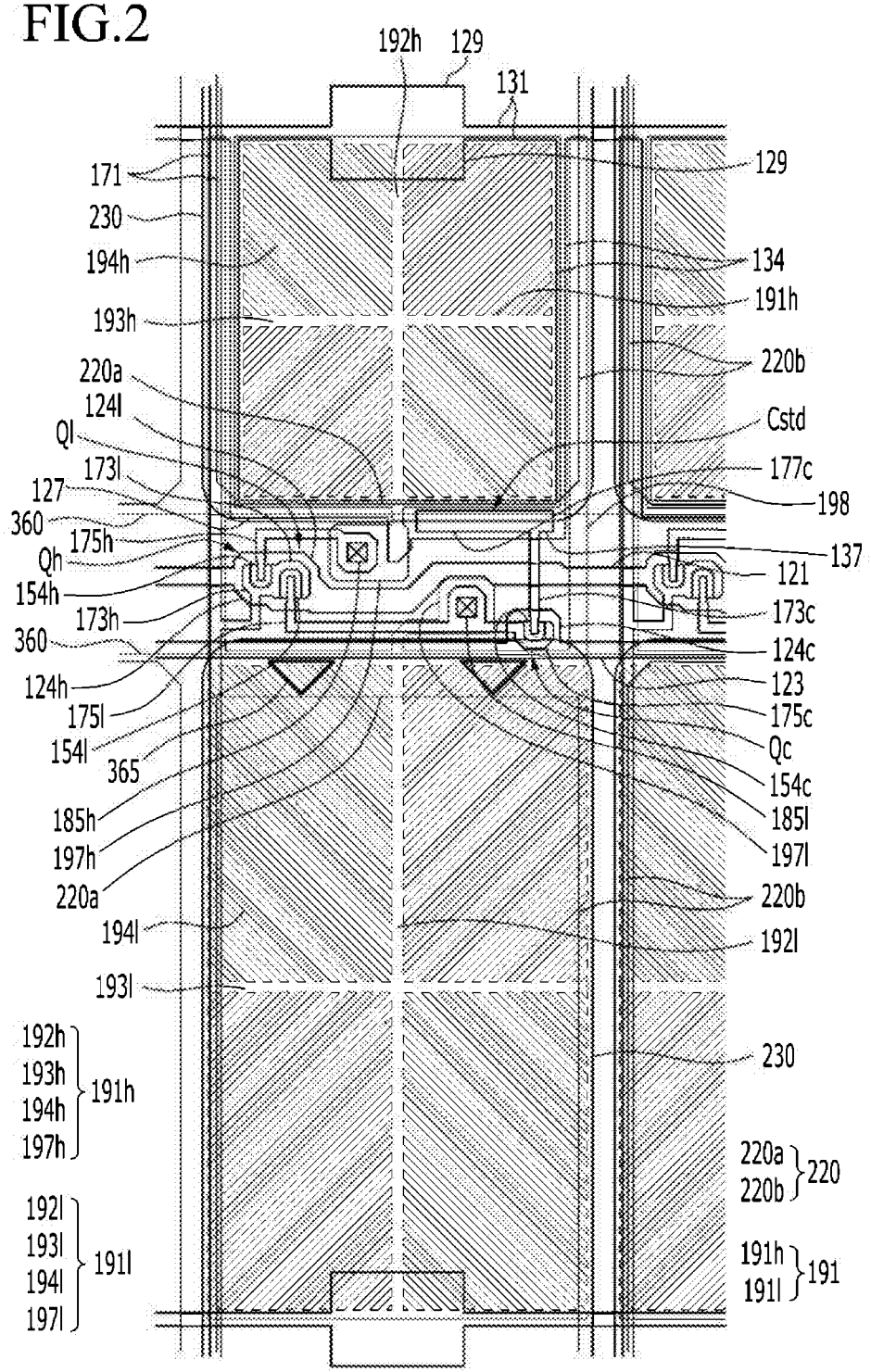
FIG. 2 is a plan view illustrating one pixel of the display device according to an embodiment of the present invention.
Figure 3:
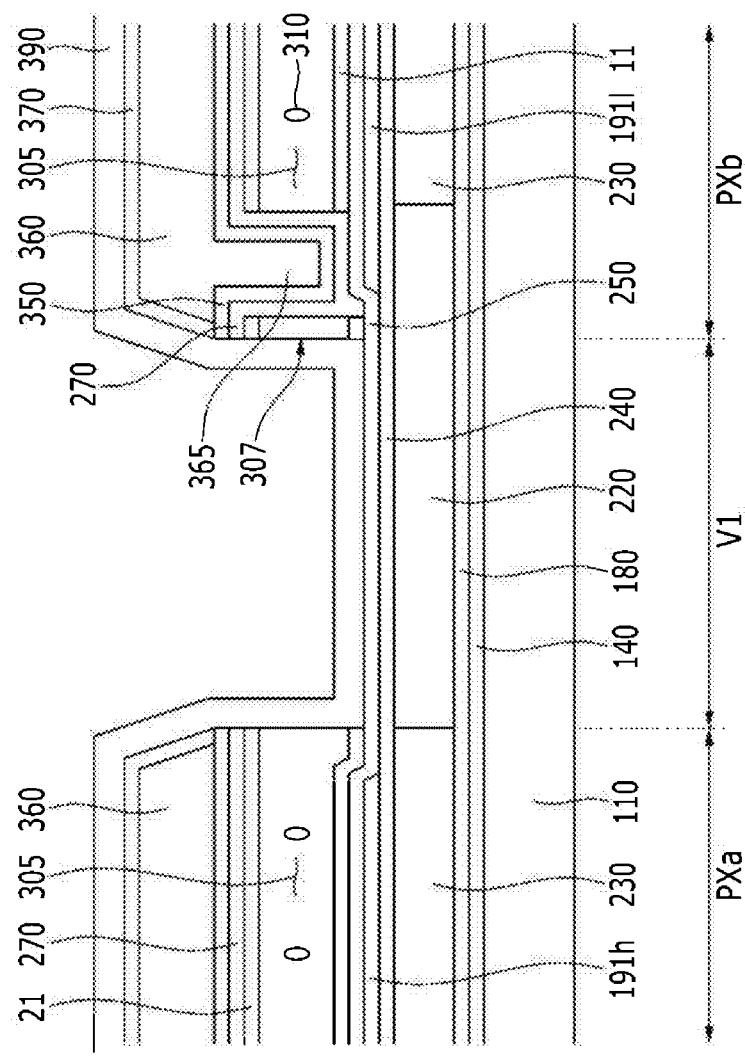
FIG. 3 is a cross-sectional view illustrating a part of the display device of FIG. 1 taken along line according to an embodiment of the present invention.
Figure 4:
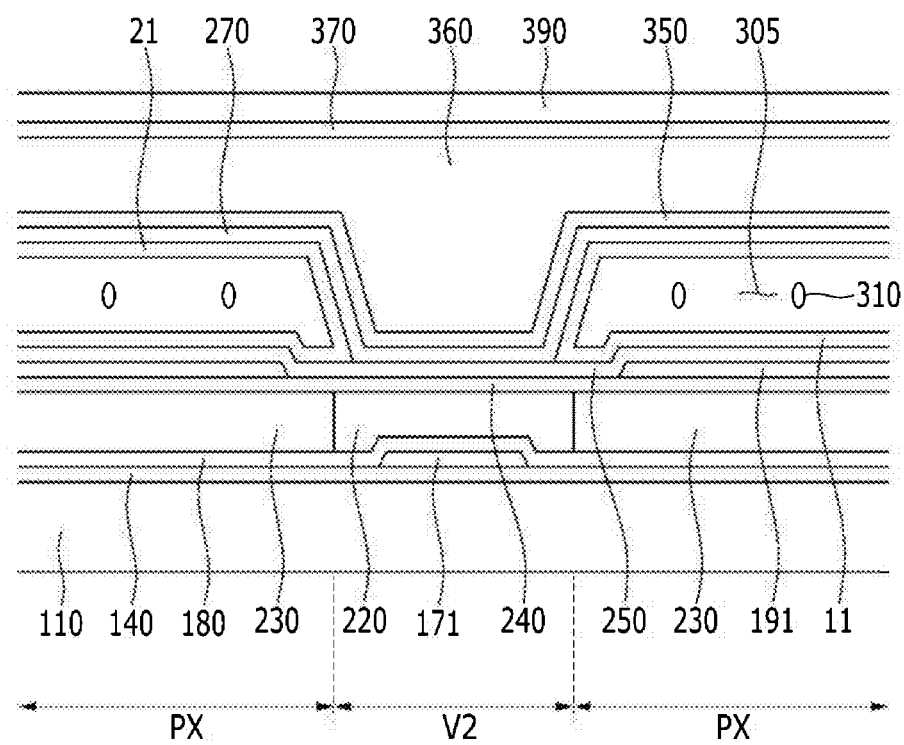
FIG. 4 is a cross-sectional view illustrating a part of the display device of FIG. 1 taken along line IV-IV according to an embodiment of the present invention.
Figure 5:
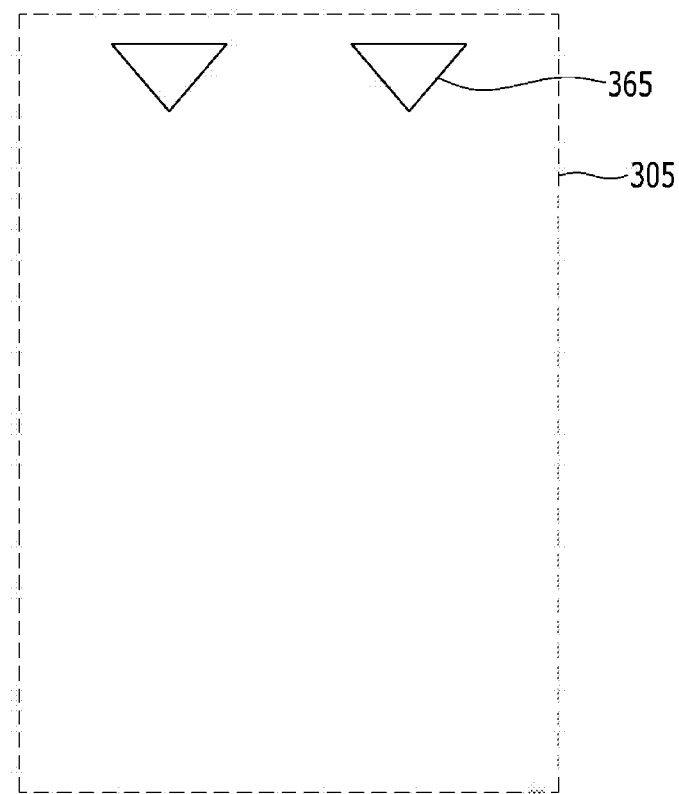
FIG. 5 is a plan view illustrating a support member of the display device according to an embodiment of the present invention.

FIG. 2 is a plan view illustrating one pixel of the display device according to an embodiment of the present invention, FIG. 3 is a cross-sectional view illustrating a part of the display device of FIG. 1 taken along line according to an embodiment of the present invention, FIG. 4 is a cross-sectional view illustrating a part of the display device of FIG. 1 taken along line IV-IV according to an embodiment of the present invention, and FIG. 5 is a plan view illustrating a support member of the display device according to an embodiment of the present invention.

Referring to FIGS. 1 to 4, a plurality of gate conductors including a plurality of gate lines 121, a plurality of step-down gate lines 123, and a plurality of storage electrode lines 131 is formed on the substrate 110.

The gate lines 121 and the step-down gate lines 123 mainly extend in a horizontal direction to transfer gate signals. The gate conductor further includes a first gate electrode 124h and a second gate electrode 124l protruding upward and downward from the gate line 121, and further includes a third gate electrode 124c protruding upward from the gate line 123. The first gate electrode 124h and the second gate electrode 124l are connected with each other to form one protrusion. In this case, the protrusion form of the first, second, and third gate electrodes 124h, 124l, and 124c may be modified.

The storage electrode line 131 mainly extends in a horizontal direction to transfer a predetermined voltage such as a common voltage Vcom. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134 with each other. The horizontal portion 127 includes a capacitor electrode 137 expanded downward.

A gate insulating layer 140 is formed on the gate conductor 121, 123, 124h, 124l, 124c, and 131. The gate insulating layer 140 may be made of an inorganic insulating material such as silicon nitride (SiNx) and silicon oxide (SiOx). Further, the gate insulating layer 140 may include a single layer or multiple layers.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may be connected to each other, and the second semiconductor 154l and the third semiconductor 154c may be connected to each other. Further, the first semiconductor 154h may be extended to the lower portion of the data line 171. The first to third semiconductors 154h, 154l, and 154c may be made of amorphous silicon, polycrystalline silicon, metal oxide, and the like.

Ohmic contacts (not illustrated) may be further formed on the first to third semiconductors 154h, 154l, and 154c, respectively. The ohmic contact may be made of silicide or a material such as n+ hydrogenated amorphous silicon in which an n-type impurity is doped at high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to cross the gate line 121 and the step-down gate line 123. Each data line 171 includes a first source electrode 173h and a second source electrode 173l which extend toward the first gate electrode 124h and the second gate electrode 124l and are connected with each other.

The first drain electrode 175h, the second drain electrode 175l, and the third drain electrode 175c include one wide end portions and the other rod-shaped end portions, respectively. The rod-shaped end portions of the first drain electrode 175h and the second drain electrode 175l are partially surrounded by the first source electrode 173h and the second source electrode 173l. One wide end portion of the second drain electrode 175l is again extended to form a third source electrode 173c which is curved in a 'U'-shape. A wide end portion 177c of the third drain electrode 175c is overlapped with the capacitor electrode 137 to form a step-down capacitor Cstd, and the rod-shaped end portion is partially surrounded by the third source electrode 173c.

The first gate electrode 124h, the first source electrode 173h, and the first drain electrode 175h form a first thin film transistor Qh together with the first semiconductor 154h, the second gate electrode 124l, the second source electrode 173l, and the second drain electrode 175l form a second thin film transistor Ql together with the second semiconductor 154l, and the third gate electrode 124c, the third source electrode 173c, and the third drain electrode 175c form a third thin film transistor Qc together with the third semiconductor 154c.

The first semiconductor 154h, the second semiconductor 154l, and the third semiconductor 154c are connected to each other to have a stripe shape, and may have substantially the same planar shape as the data conductor 171, 173h, 173l, 173c, 175h, 175l, and 175c and the ohmic contacts therebelow, except for channel regions between the source electrodes 173h, 173l, and 173c and the drain electrodes 175h, 175l, and 175c.

In the first semiconductor 154h, an exposed portion which is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, an exposed portion which is not covered by the third source electrode 173c and the third drain electrode 175c is disposed between the third source electrode 173c and the third drain electrode 175c.

A passivation layer 180 is formed on the data conductor 171, 173h, 173l, 173c, 175h, 175l, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed in a single layer or a multiple layer.

A color filter 230 in each pixel area PX is formed on the passivation layer 180. Each color filter 230 may display one of primary colors such as, for example, three primary colors of red, green and blue. The color filter 230 is not limited to the three primary colors of red, green and blue, but may display cyan, magenta, yellow, and white-based colors, and the like. Unlike those illustrated above, the color filter 230 may be elongated in a column direction along a space between the adjacent data lines 171.

A light blocking member 220 is formed in a region between the adjacent color filters 230. The light blocking member 220 is formed to be overlapped with a boundary of the pixel area PX, the thin film transistor, and the support member 365 to prevent light leakage. The color filter 230 is formed in each of the first subpixel area PXa and the second subpixel area PXb, and the light blocking member 220 may be formed between the first subpixel area PXa and the second subpixel area PXb.

The light blocking member 220 includes a horizontal light blocking member 220a which extends along the gate line 121 and the step-down gate line 123 to be expanded upward and downward, and covers regions in which the first thin film transistor Qh, the second thin film transistor Ql, and the third thin film transistor Qc are positioned, and a vertical light blocking member 220b which extends along the data line 171. That is, the horizontal light blocking member 220a may be formed at the first valley V1, and the vertical light blocking member 220b may be formed at the second valley V2. The color filter 230 and the light blocking member 220 may be overlapped with each other in a partial region.

A first insulating layer 240 may be further formed on the color filter 230 and the light blocking member 220. The first insulating layer 240 may be made of an inorganic insulating material such as silicon nitride (SiNx) or silicon oxide (SiOx). The first insulating layer 240 serves to protect the color filter 230 made of the organic material and the light blocking member 220, and may be omitted if necessary.

In the first insulating layer 240, the light blocking member 220, and the passivation layer 180, a plurality of first contact holes 185h and a plurality of second contact holes 185l, which expose the wide end portion of the first drain electrode 175h and the wide end portion of the second drain electrode 175l, respectively, are formed.

A pixel electrode 191 is formed on the first insulating layer 240. The pixel electrode 191 may be made of a transparent metal material such as indium tin oxide (ITO) or indium zinc oxide (IZO).

The pixel electrode 191 includes the first subpixel electrode 191h and the second subpixel electrode 191l, which are separated from each other with the gate line 121 and the step-down gate line 123 therebetween and disposed above and below the pixel area PX based on the gate line 121 and the step-down gate line 123 to be adjacent to each other in a column direction. That is, the first subpixel electrode 191h and the second subpixel electrode 191l are separated from each other with the first valley V1 therebetween, the first subpixel electrode 191h is positioned in the first subpixel area PXa, and the second subpixel electrode 191l is positioned in the second subpixel area PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l.

An overall shape of each of the first subpixel electrode 191h and the second subpixel electrode 191l is a quadrangle, and the first subpixel electrode 191h and the second subpixel electrode 191l include cross stems including horizontal stems 193h and 193l and vertical stems 192h and 192l crossing the horizontal stems 193h and 193l, respectively. Further, the first subpixel electrode 191h and the second subpixel electrode 191l include a plurality of minute branches 194h and 194l, and protrusions 197h and 197l protruding upward or downward from edge sides of the subpixel electrodes 191h and 191l, respectively.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l.

Further, directions in which the minute branches 194h and 194l of the two adjacent subregions extend may be perpendicular to each other.

In one embodiment, the first subpixel electrode 191h further includes an outer stem surrounding the outside, and the second subpixel electrode 191l includes horizontal portions positioned at an upper end and a lower end, and left and right vertical portions 198 positioned at the left and the right of the first subpixel electrode 191h. The left and right vertical portions 198 may prevent a capacitive coupling, that is, coupling between the data line 171 and the first subpixel electrode 191h.

The layout form of the pixel area, the structure of the thin film transistor, and the shape of the pixel electrode described above are just examples, and the present invention is not limited thereto and may be variously modified.

A second insulating layer 250 may be further formed on the pixel electrode 191. The second insulating layer 250 may be made of an inorganic insulating material such as silicon nitride (SiNx) or silicon oxide (SiOx). The second insulating layer 250 serves to protect the pixel electrode 191 and may be omitted if necessary.

A common electrode 270 is formed on the pixel electrode 191 so as to be spaced apart from the pixel electrode 191 at a predetermined distance. A microcavity 305 is formed between the pixel electrode 191 and the common electrode 270. The microcavity 305 is surrounded by the pixel electrode 191 and the common electrode 270. A width and an area of the microcavity 305 may be variously modified according to a size and resolution of the display device.

Even though the common electrode 270 is formed to be overlapped with the pixel electrode 191, since the second insulating layer 250 is formed on the pixel electrode 191, it is possible to prevent the common electrode 270 and the pixel electrode 191 which contact each other from being short-circuited.

However, the present invention is not limited thereto, and the common electrode 270 may be formed directly on the second insulating layer 250. That is, the microcavity 305 is not formed between the pixel electrode 191 and common electrode 270, and the common electrode 270 may be formed with the pixel electrode 191 and the second insulating layer 250 therebetween. In this case, the microcavity 305 may be formed on the common electrode 270.

The common electrode 270 may be made of a transparent metal material such as indium tin oxide (ITO) or indium zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the second insulating layer 250 which is not covered by the pixel electrode 191.

A second alignment layer 21 is formed below the common electrode 270 to face the first alignment layer 11.

The first alignment layer 11 and the second alignment layer 21 may be formed by vertical alignment layers and made of alignment materials such as polyamic acid, polysiloxane, or polyimide. The first and second alignment layers 11 and 21 may be connected to each other at the edge of the pixel area PX.

A liquid crystal layer configured by liquid crystal molecules 310 is formed in the microcavity 305 positioned between the pixel electrode 191 and the common electrode 270. The liquid crystal molecules 310 have negative dielectric anisotropy and may stand up in a vertical direction to the substrate 110 while the electric field is not applied. That is, a vertical alignment may be performed.

The first subpixel electrode 191h and the second subpixel electrode 191l to which the data voltages are applied generate an electric field together with a common electrode 270 to determine directions of the liquid crystal molecules 310 positioned in the microcavity 305 between the two electrodes 191 and 270. As such, luminance of light passing through the liquid crystal layer varies according to the determined directions of the liquid crystal molecules 310.

A third insulating layer 350 may be further formed on the common electrode 270. The third insulating layer 350 may be made of an inorganic insulating material such as silicon nitride (SiNx) and silicon oxide (SiOx) and may be omitted if necessary.

A roof layer 360 is formed on the third insulating layer 350. The roof layer 360 may be made of an organic material. The microcavity 305 is formed below the roof layer 360, and the roof layer 360 is hardened by a curing process to maintain a shape of the microcavity 305. The roof layer 360 is formed to be spaced apart from the pixel electrode 191 with the microcavity 305 therebetween.

The roof layer 360 is formed in each pixel area PX and the second valley V2 along a pixel row, and is not formed in the first valley V1. That is, the roof layer 360 is not formed between the first subpixel area PXa and the second subpixel area PXb. The microcavity 305 is formed below each roof layer 360 in each of the first subpixel area PXa and the second subpixel area PXb. In the second valley V2, the microcavity 305 is not formed below the roof layer 360 but formed to be attached to the substrate 110. Accordingly, a thickness of the roof layer 360 positioned at the second valley V2 may be larger than a thickness of the roof layer 360 positioned in each of the first subpixel area PXa and the second subpixel area PXb. An upper surface and both side surfaces of the microcavity 305 have a form to be covered by the roof layer 360.

An injection hole 307 exposing a part of the microcavity 305 is formed in the roof layer 360. The injection holes 307 may be formed to face each other at the edges of the first subpixel area PXa and the second subpixel area PXb as described above. That is, the injection holes 307 may correspond to a lower side of the first subpixel area PXa and an upper side of the second subpixel area PXb to expose a side surface of the microcavity 305.

Since the microcavity 305 is exposed by the injection hole 307, an aligning agent or a liquid crystal material may be injected into the microcavity 305 through the injection hole 307.

The support member 365 is adjacent to the injection hole 307 to have a column shape at the microcavity 305. The injection hole 307 is positioned at an edge of the microcavity 305, and two injection holes 307 are formed in one microcavity 305. For example, respective injection holes 307 are positioned at an upper edge and a lower edge of one microcavity 305. The support member 365 is formed at only one of the two injection holes 307. For example, the support member 365 may be formed to be adjacent to the injection hole 307 positioned at the upper edge of the microcavity 305. In this case, the support member 365 is not formed at a position which is adjacent to the injection hole 307 positioned at the lower edge of the microcavity 305.

The first alignment layer 11 and the second alignment layer 21 may be formed by injecting the aligning agent, and solids are concentrated at one place of the aligning agent during a drying process, and as a result, an aggregation phenomenon of the alignment layer occurs. Since the support member 365 is formed to be adjacent to the injection hole 307 positioned at one edge of the microcavity 305, capillary forces in the two injection holes 307 formed in one microcavity 305 are different from each other. Since the capillary force in the injection hole 307 formed at the support member 365 is relatively large, the aggregation phenomenon of the alignment layer occurs around the injection hole 307 formed at the support member 365. At the place where the aggregation phenomenon of the alignment layer occurs, light may not be transmitted well, and as a result, a screen may not be displayed well. The aggregation phenomenon of the alignment layer may occur at the edge of the first pixel area PXa or the second pixel area PXb. Further, since the light blocking member 220 is formed to be overlapped with the support member 365, the aggregation phenomenon of the alignment layer may be prevented from being recognized as a defect. Since an area of forming the light blocking member 220 may be reduced so that the support member 365 is formed to be closer to the injection hole 307, an aperture ratio may be also improved.

The sagging phenomenon of the roof layer 360 may occur at a place where the aggregation phenomenon of the alignment layer occurs. Since the support member 365 is formed at the place where the aggregation phenomenon of the alignment layer occurs to support the roof layer 360, deformation of the roof layer 360 may be prevented.

The support member 365 is connected with the roof layer 360, and may be made of the same material as the roof layer 360. A third insulating layer 350 and a common electrode 270 may be further positioned below the support member 365. The support member 365 may be overlapped with the pixel electrode 191, and in this case, the common electrode 270 may also be overlapped with the pixel electrode 191. Since the second insulating layer 250 is formed on the pixel electrode 191, a short circuit between the common electrode 270 and the pixel electrode 191 may be prevented from occurring.

However, the present invention is not limited thereto, and the support member 365 may be made of a different material from the roof layer 360, and the third insulating layer 350 and the common electrode 270 may not be positioned below the support member 365. In this case, the support member 365 may be formed directly on the pixel electrode 191, or formed directly on the second insulating layer 250 or the first insulating layer 240.

Hereinafter, a planar shape of the support member 365 which is viewed from the upper side of the substrate 110 will be described below.

As illustrated in FIG. 5, the support member 365 is formed at one edge of one microcavity 305.

For example, the support member 365 may form a triangle. One side of the triangle is disposed to be parallel with the injection hole 307. A distance between the support member 365 and a side wall of the roof layer 360 becomes smaller as it becomes closer to the injection hole 307 due to the shape and the layout of the support member 365. Accordingly, the capillary force becomes strong as it becomes closer to the injection hole 307, and solids of the aligning agent may be pushed to the injection hole 307 between the support member 365 and the roof layer 360. Therefore, since the place where the aggregation phenomenon of the alignment layer occurs is closer to the injection hole 307, an aperture ratio may be further improved.

The support member 365 may form a circle or a rectangle. However, in an aspect of the improvement of the aperture ratio, it is more advantageous that the distance between the support member 365 and the side wall of the roof layer 360 is smaller as it becomes closer to the injection hole 307.

In this regard, an experimental result of an aperture ratio according to a shape of the support member 365 will be described below with reference to FIGS. 6 and 7.

Figure 6:
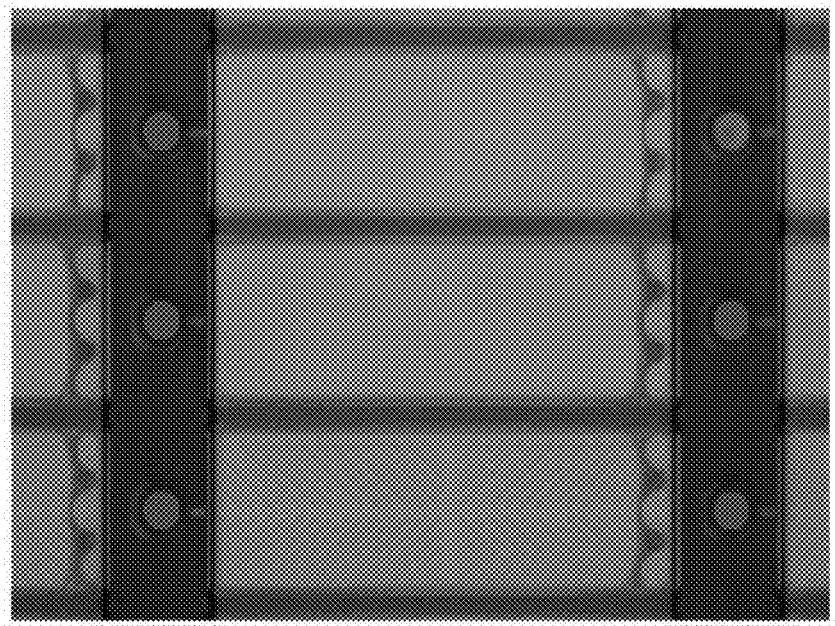
FIG. 6 is a diagram illustrating light emitted from an upper side of the display device when a support member has a circular shape.
Figure 7:
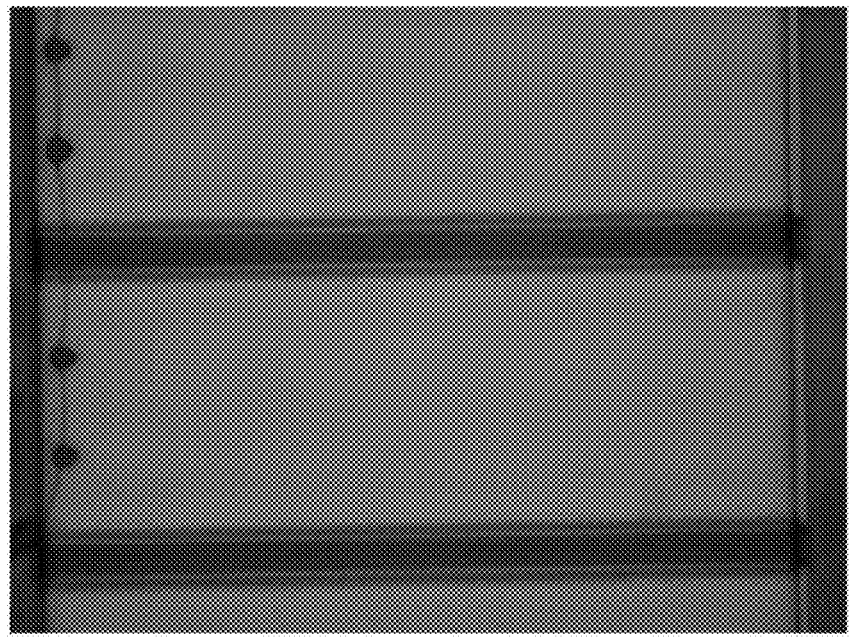
FIG. 7 is a diagram illustrating light emitted from an upper side of the display device when a support member has a triangular shape.

FIG. 6 is a diagram illustrating light emitted from an upper side of the display device when a support member has a circular shape, and FIG. 7 is a diagram illustrating light emitted from an upper side of the display device when a support member has a triangular shape.

As illustrated in FIG. 6, in the case where the support member 365 forms a circle, a portion where the aggregation phenomenon occurs between the support member 365 and the side wall of the roof layer 360 is positioned at a place farther away from the injection hole 307 than the support member 365.

As illustrated in FIG. 7, in the case where the support member 365 forms a triangle, a portion where the aggregation phenomenon occurs between the support member 365 and the side wall of the roof layer 360 is positioned at a place closer to the injection hole 307 than the support member 365. Accordingly, an area which needs to cover an inside of the pixel area by using the light blocking member 220 is smaller as compared with the case where the support member 365 forms the circle. That is, the aperture ratio may be improved.

Referring back to FIG. 5, a plurality of support members 365 may be formed in one microcavity 305. For example, two support members 365 may be formed for each microcavity 305. However, this is just an example, and in the case where the microcavity 305 is further increased or a size of the support member 365 is further decreased, the number of support members 365 formed in one microcavity 305 may be further increased.

A distance between the adjacent support members 365 among the plurality of support members 365 is smaller as it becomes closer to the injection hole 307. Accordingly, the capillary force becomes stronger as it becomes closer to the injection hole 307, and solids of the aligning agent may be pushed to the injection hole 307 between the adjacent support members 365. Therefore, since the place where the aggregation phenomenon of the alignment layer occurs is closer to the injection hole 307, an aperture ratio may be further improved.

The shape of the support member 365 may be variously formed so that the distance between the support member 365 and the side wall of the roof layer 360 or the distance between the adjacent support members 365 is smaller as it becomes closer to the injection hole 307. The support member 365 has a form in which a width of the support member 365 is larger as it becomes closer to the injection hole 307.

Hereinafter, various shapes of the support member 365 will be described below with reference to FIGS. 8 to 14.

FIGS. 8 to 14 are plan views illustrating various shapes of the support member of the display device according to an embodiment of the present invention.

Figure 8:
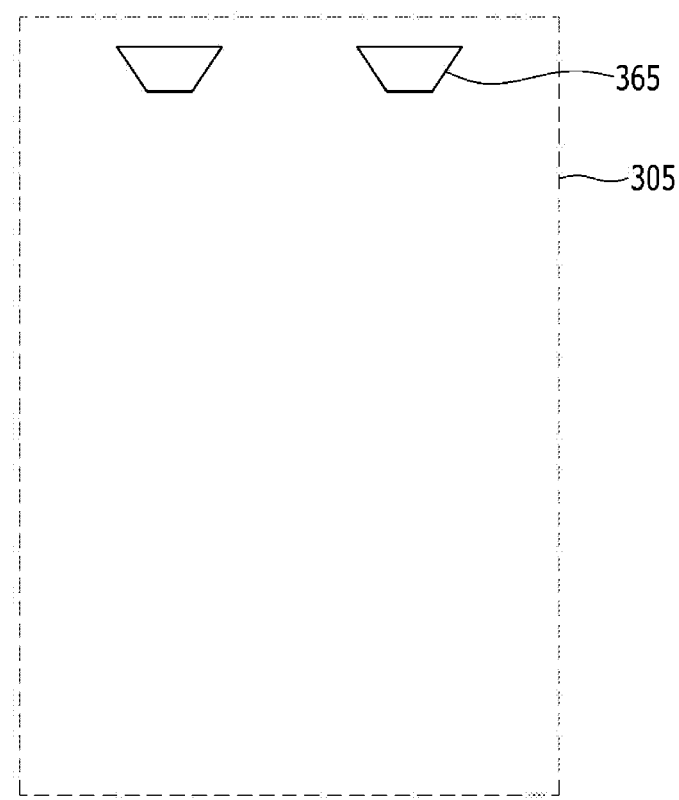
FIGS. 8 to 14 are plan views illustrating various shapes of the support member of the display device according to an embodiment of the present invention.

The support member 365 may form a trapezoid as illustrated in FIG. 8. In this case, a longer side of an upper side and a lower side of the trapezoid may be disposed to be parallel with the injection hole 307 at a closer place with the injection hole 307. The distance between the support member 365 and the side wall of the roof layer 360 or the distance between the adjacent support members 365 becomes smaller as it becomes closer to the injection hole 307 due to the shape and the layout of the support member 365.

Figure 9:
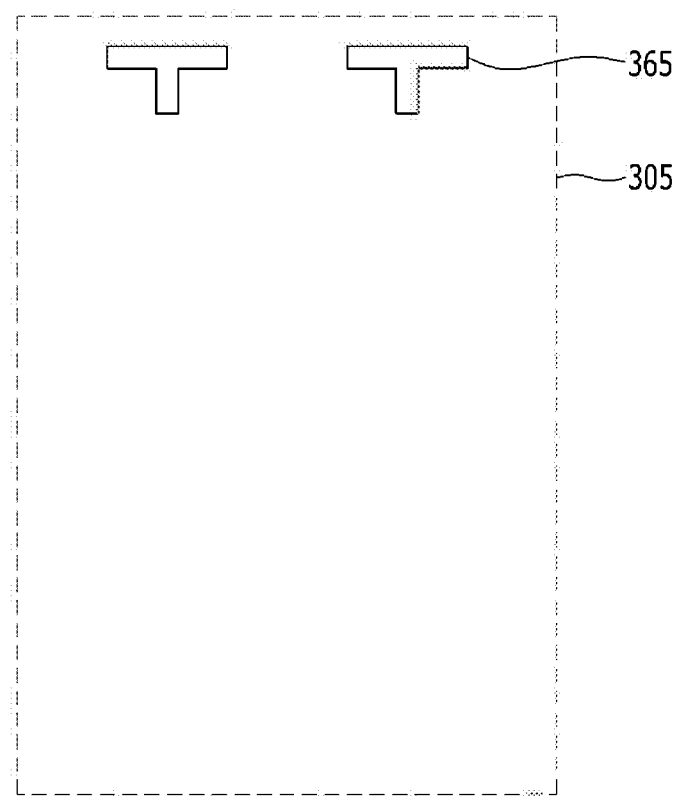

As illustrated in FIG. 9, the support member 365 may form a T-shape. In this case, an upper side of the T-shape may be disposed to be parallel with the injection hole 307 at a closer place to the injection hole 307.

Figure 10:
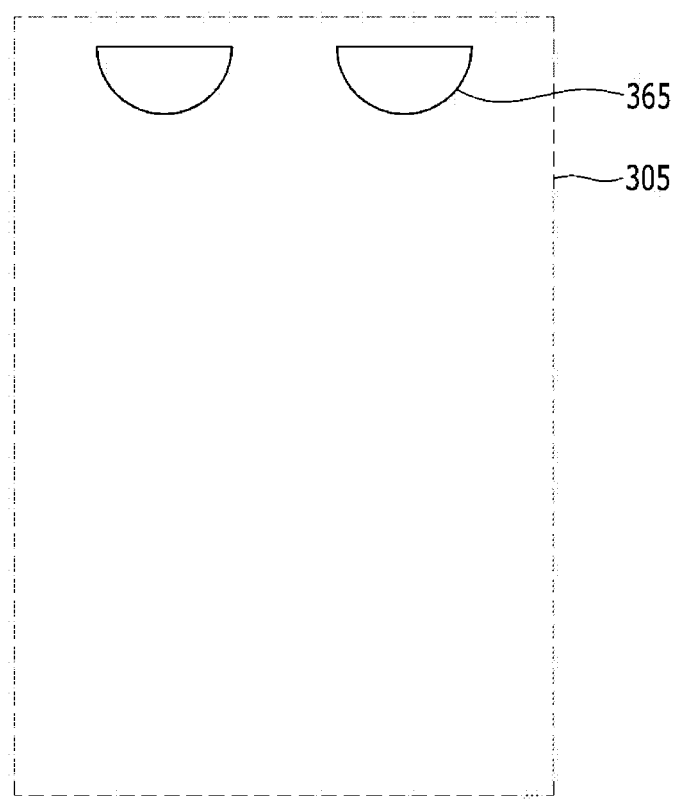

As illustrated in FIG. 10, the support member 365 may form a semicircle or semioval. In this case, the semicircle or semioval is constituted by one straight component and one curved component, the straight component may be disposed to be parallel with the injection hole 307 at the closer place to the injection hole 307.

Figure 11:
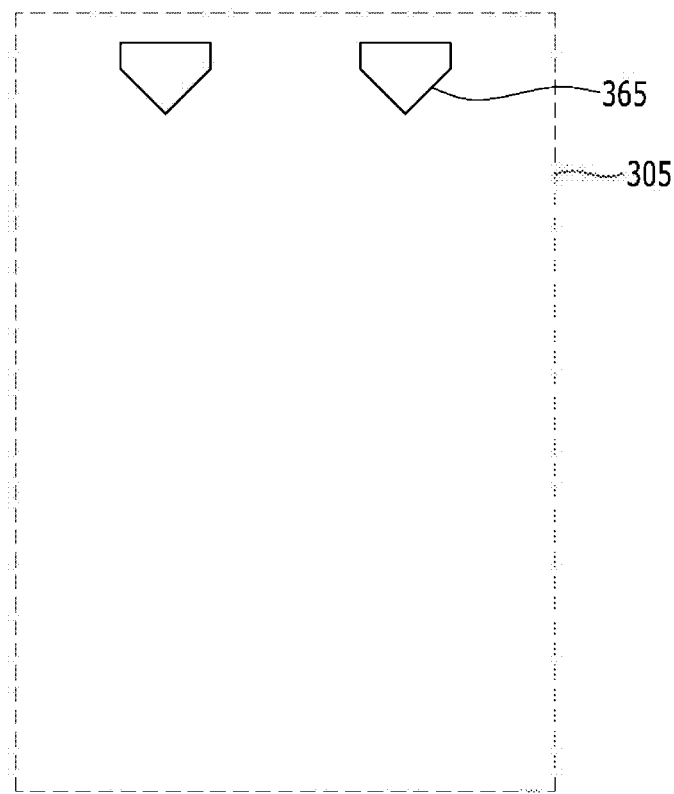

As illustrated in FIG. 11, the support member 365 may form a pentagon. In this case, the pentagon is constituted by a quadrangular component and a triangular component, and the quadrangular component may form a rectangle. Further, the quadrangular component may be disposed to be parallel with the injection hole 307 at a closer place to the injection hole 307.

Figure 12:
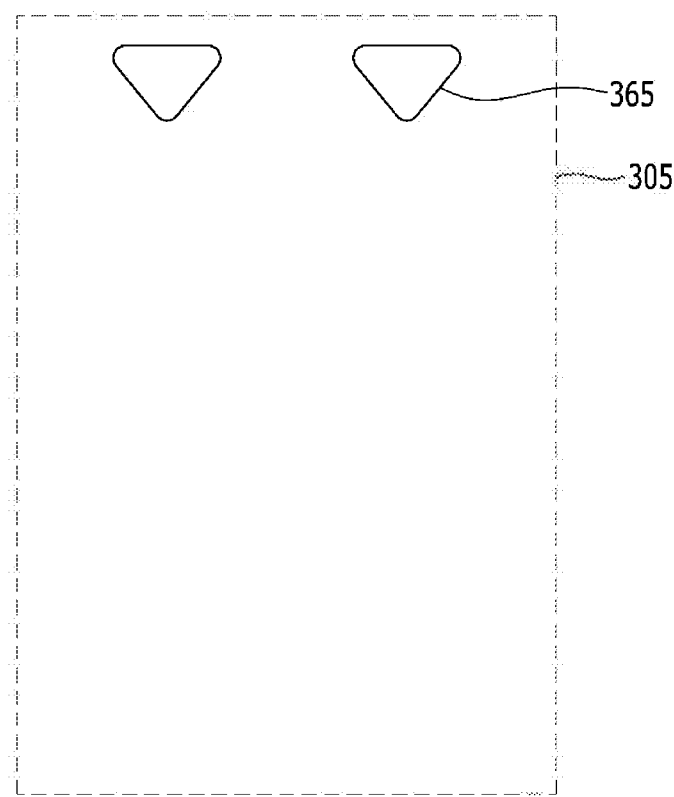

As illustrated in FIG. 12, the support member 365 may have a shape in which each apex of the triangle is roundly modified. As illustrated in FIG. 5, although the support member 365 is designed, the apexes may be modified during a patterning process, and accordingly, the modification may be represented as illustrated in FIG. 12. Similar modification may occur even in the shapes of the support member 365 illustrated in FIGS. 8 to 11 in like manner.

Figure 13:
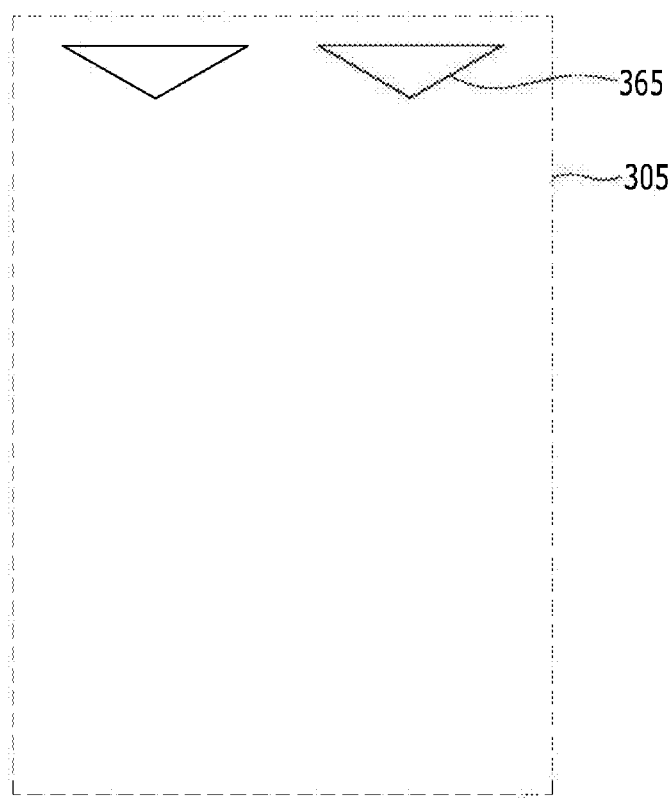

As illustrated in FIG. 13, a length of one side of the support member 365 which is adjacent to the injection hole 307 may be variously formed. The support members 365 illustrated in FIGS. 5 and 13 have the same shape, but the length of one side of the support members 365 adjacent to the injection hole 307 varies. That is, the length of one side of the support members 365 adjacent to the injection hole 307 may be modified to be larger or smaller. In the case where the length of one side of the support members 365 adjacent to the injection hole 307 is larger, a difference in capillary force between the place close to the injection hole 307 and the place far from the injection hole may be further increased. Accordingly, the place where the aggregation phenomenon of the alignment layer occurs may be closer to the injection hole 307.

Figure 14:
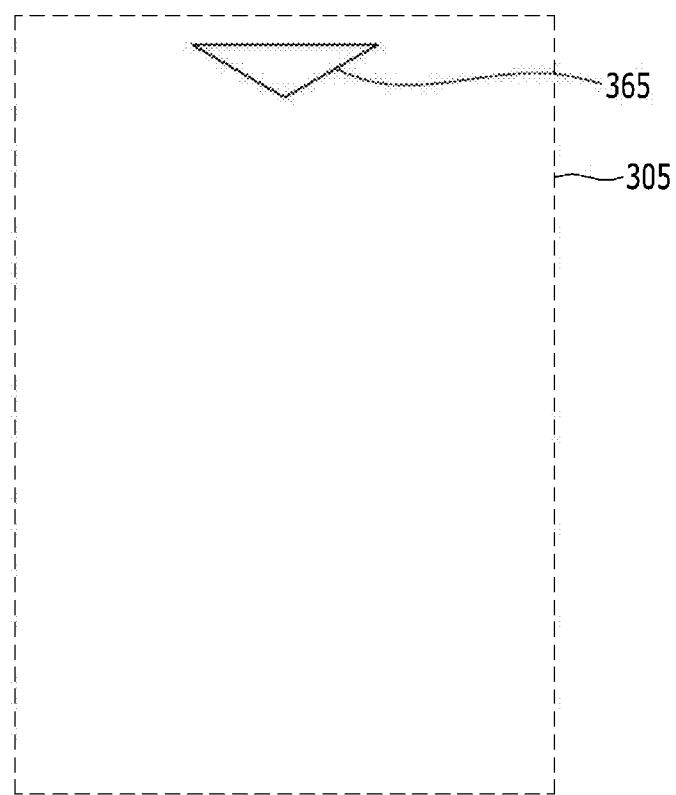

As illustrated in FIG. 14, only one support member 365 may be formed in one microcavity 305. As described above, the number of support members 365 formed in one microcavity 305 may be variously modified according to sizes of the microcavity 305 and the support member 365.

The support member 365 may have various shapes in addition to the illustrated shapes.

A fourth insulating layer 370 may be further formed on the roof layer 360. The fourth insulating layer 370 may be made of an inorganic insulating material such as silicon nitride (SiNx) or silicon oxide (SiOx). The fourth insulating layer 370 may be formed to cover the top surface and the side surface of the roof layer 360. The fourth insulating layer 370 serves to protect the roof layer 360 made of an organic material and may be omitted if necessary.

An encapsulation layer 390 may be formed on the fourth insulating layer 370. The encapsulation layer 390 is formed to cover the injection hole 307 where a part of the microcavity 305 is exposed outside. That is, the encapsulation layer 390 may seal the microcavity 305 so that the liquid crystal molecules 310 formed in the microcavity 305 are not discharged outside. Since the encapsulation layer 390 contacts the liquid crystal molecules 310, the encapsulation layer 390 may be made of a material which does not react with the liquid crystal molecules 310. For example, the encapsulation layer 390 may be made of parylene and the like.

The encapsulation layer 390 may be formed by a multi-layer such as a double layer or a triple layer. The double layer is configured by two layers made of different materials. The triple layer is configured by three layers, and materials of adjacent layers are different from each other. For example, the encapsulation layer 390 may include a layer made of an organic insulating material or a layer made of an inorganic insulating material.

Although not illustrated, polarizers may be further formed on the upper and lower sides of the display device. The polarizers may be configured by a first polarizer and a second polarizer. The first polarizer may be attached onto the lower side of the substrate 110, and the second polarizer may be attached onto the encapsulation layer 390.

The distance between the support member 365 and the side wall of the roof layer 360 is smaller as it becomes closer to the injection hole 307, and the distance between the plurality of adjacent support members 365 is smaller as it becomes closer to the injection hole 307, but the present invention is not limited thereto. When a cross section of the microcavity 305 is smaller as it becomes closer to the injection hole 307, the capillary force may be stronger as it becomes closer to the injection hole 307. Accordingly, a height of the microcavity 305 may be smaller as it becomes closer to the injection hole 307. In this case, the width of the support member 365 may be uniformly formed.

Next, a display device according to an embodiment of the present invention will be described below with reference to FIGS. 15 and 16.

Figure 15:
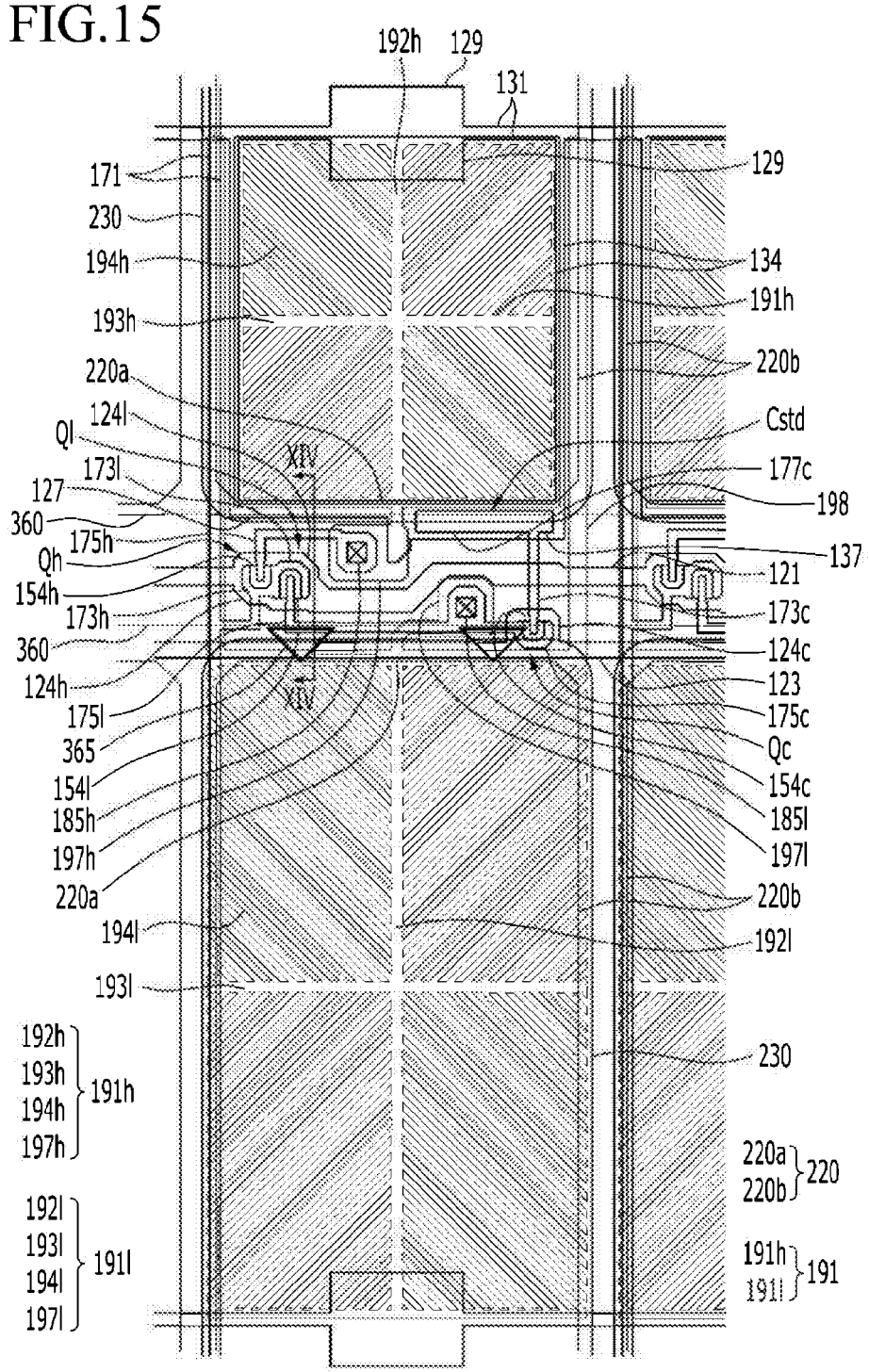
FIG. 15 is a plan view illustrating one pixel of a display device according to an embodiment of the present invention.
Figure 16:
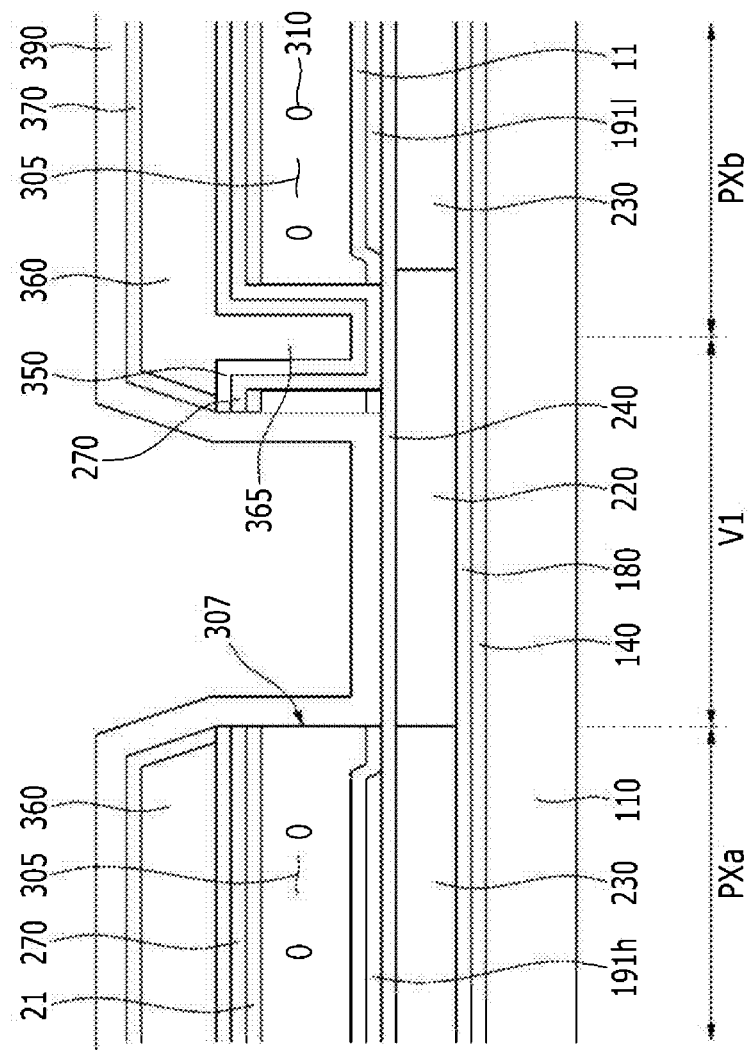
FIG. 16 is a cross-sectional view illustrating a part of the display device of FIG. 15 taken along line XVI-XVI according to an embodiment of the present invention.

Since the display device according to an embodiment of the present invention illustrated in FIGS. 15 and 16 is almost the same as the display device according to the embodiment of the present invention illustrated in FIGS. 1 to 5, the description thereof is omitted, and only different parts will be described below. One difference from the above embodiment is that a support member is not overlapped with a pixel electrode, and hereinafter, the difference will be described in more detail.

FIG. 15 is a plan view illustrating one pixel of the display device according to an embodiment of the present invention, and FIG. 16 is a cross-sectional view illustrating a part of the display device of FIG. 15 taken along line XVI-XVI.

Referring to FIGS. 15 and 16, a thin film transistor and a pixel electrode 191 connected to the thin film transistor are formed on a substrate 110. The roof layer 360 is formed on the pixel electrode 191 with the microcavity 305 therebetween, and the support member 365 is formed in the microcavity 305 to be adjacent to the injection hole 307. A liquid crystal layer constituted by liquid crystal molecules 310 is formed in the microcavity 305, and an encapsulation layer 390 is formed on the roof layer 360 to seal the microcavity 310.

The support member 365 is connected with the roof layer 360, and may be made of the same material as the roof layer 360. A third insulating layer 350 and a common electrode 270 may be further positioned below the support member 365. The support member 365 may be formed so as not to be overlapped with the pixel electrode 191. Accordingly, even though a separate insulating layer is not formed between the pixel electrode 191 and the common electrode 270, the common electrode 270 and the pixel electrode 191 may be prevented from being short-circuited.

Since the support member 365 and the pixel electrode 191 are overlapped with each other, the second insulating layer (250 of FIG. 3) is formed so that the common electrode 270 positioned below the support member 365 is not short-circuited from the pixel electrode 191. The support member 365 and the pixel electrode 191 are not overlapped with each other, and as a result, the short circuit between the common electrode 270 and the pixel electrode 191 may be prevented without forming the second insulating layer.

Next, a manufacturing method of a display device according to an embodiment of the present invention will be described below with reference to FIGS. 17 to 22. Further, the manufacturing method will be described with reference to FIGS. 1 to 5 together.

FIGS. 17 to 22 are process cross-sectional views illustrating a manufacturing method of a display device according to an embodiment of the present invention.

Figure 17:
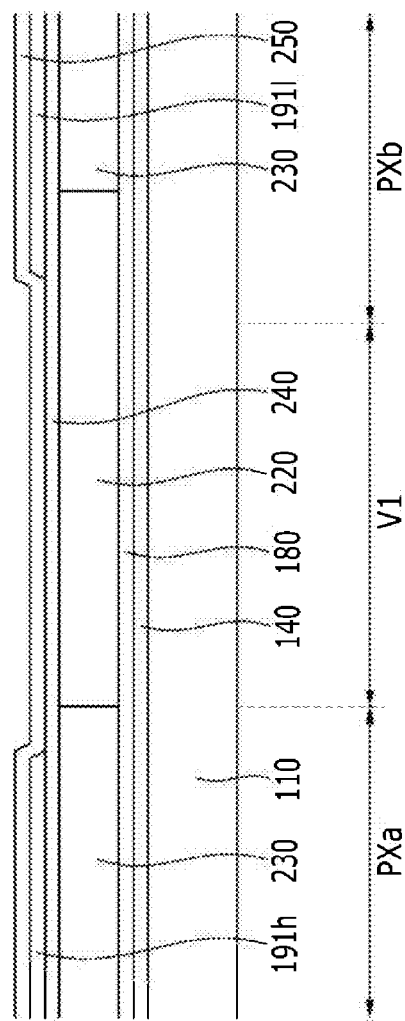
FIGS. 17 to 22 are process cross-sectional views illustrating a manufacturing method of a display device according to an embodiment of the present invention.

As illustrated in FIG. 17, a gate line 121 and a step-down gate line 123 extending in one direction are formed on a substrate 110 made of glass or plastic, and a first gate electrode 124h, a second gate electrode 124l, and a third gate electrode 124c which protrude from the gate line 121 are formed.

Further, a storage electrode line 131 may be formed together so as to be spaced apart from the gate line 121, the step-down gate line 123, and the first to third gate electrodes 124h, 124l, and 124c.

Next, a gate insulating layer 140 is formed on the entire surface of the substrate 110 including the gate line 121, the step-down gate line 123, the first to third gate electrodes 124h, 124l, and 124c, and the storage electrode line 131 by using an inorganic insulating material such as silicon oxide (SiOx) or silicon nitride (SiNx). The gate insulating layer 140 may be formed by a single layer or a multiple layer.

Next, a first semiconductor 154h, a second semiconductor 154l, and a third semiconductor 154c are formed by depositing a semiconductor material such as amorphous silicon, polycrystalline silicon, and metal oxide on the gate insulating layer 140 and then patterning the deposited semiconductor material. The first semiconductor 154h may be positioned on the first gate electrode 124h, the second semiconductor 154l may be positioned on the second gate electrode 124l, and the third semiconductor 154c may be positioned on the third gate electrode 124c.

Next, a data line 171 extending in the other direction is formed by depositing a metal material and then patterning the deposited metal material. The metal material may be formed by a single layer or a multiple layer.

Further, a first source electrode 173h protruding above the first gate electrode 124h from the data line 171 and a first drain electrode 175h spaced apart from the first source electrode 173h are formed together. Further, a second source electrode 173l connected with the first source electrode 173h and a second drain electrode 175l spaced apart from the second source electrode 173l are formed together. Further, a third source electrode 173c extended from the second drain electrode 175l and a third drain electrode 175c spaced apart from the third source electrode 173c are formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing a semiconductor material and a metal material and then patterning the semiconductor material and the metal material at the same time. In this case, the first semiconductor 154h may be extended to the lower portion of the data line 171.

The first/second/third gate electrodes 124h/124l/124c, the first/second/third source electrodes 173h/173l/173c, and the first/second/third drain electrodes 175h/175l/175c configure first/second/third thin film transistors (TFTs) Qh/Ql/Qc together with the first/second/third semiconductors 154h/154l/154c, respectively.

Next, a passivation layer 180 is formed on the data line 171, the first to third source electrodes 173h, 173l, and 173c, the first to third drain electrodes 175h, 175l, and 175c, and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed in a single layer or a multiple layer.

Next, a color filter 230 is formed in each pixel area PX on the passivation layer 180. The color filter 230 is formed in each of the first subpixel area PXa and the second subpixel area PXb, and may not be formed at the first valley V1. Further, the color filters 230 having the same color may be formed in a column direction of the plurality of pixel areas PX. In the case of forming the color filters 230 having three colors, a first colored color filter 230 may be first formed and then a second colored color filter 230 may be formed by shifting a mask. Next, the second colored color filter 230 may be formed and then a third colored color filter may be formed by shifting a mask.

Next, a light blocking member 220 is formed on a boundary of each pixel area PX on the passivation layer 180 and the thin film transistor. The light blocking member 220 may be formed even at the first valley V1 positioned between the first subpixel area PXa and the second subpixel area PXb.

Further, the light blocking member 220 is formed even at one edge of each pixel area PX. The light blocking member 220 is formed to correspond to a portion which is overlapped with a support member 365 to be formed below.

Hereinabove, the light blocking member 220 is formed after forming the color filters 230, but the present invention is not limited thereto, and the light blocking member 220 is first formed and then the color filters 230 may be formed.

Next, a first insulating layer 240 made of an inorganic insulating material such as silicon nitride (SiNx) and silicon oxide (SiOx) is formed on the color filter 230 and the light blocking member 220.

Next, a first contact hole 185h is formed by etching the passivation layer 180, the light blocking member 220, and the first insulating layer 240 so as to expose a part of the first drain electrode 175h, and a second contact hole 185l is formed so as to expose a part of the second drain electrode 175l.

Next, a first subpixel electrode 191h is formed in the pixel first subpixel area PXa, and a second subpixel electrode 191l is formed in second subpixel area PXb, by depositing and patterning a transparent metal material such as indium tin oxide (ITO) or indium zinc oxide (IZO) on the first insulating layer 240. The first subpixel electrode 191h and the second subpixel electrode 191l are separated from each other with the first valley V1 therebetween. The first subpixel electrode 191h is connected with the first drain electrode 175h through the first contact hole 185h, and the second subpixel electrode 191l is connected with the second drain electrode 175l through the second contact hole 185l.

Horizontal stems 193h and 193l, and vertical stems 192h and 192l crossing the horizontal stems 193h and 193l are formed in the first subpixel electrode 191h and the second subpixel electrode 191l, respectively. Further, a plurality of minute branches 194h and 194l, which obliquely extend from the horizontal stems 193h and 193l and the vertical stems 192h and 192l, is formed.

Next, a second insulating layer 250 may be formed on the pixel electrode 191 with an inorganic insulating material such as silicon nitride (SiNx) and silicon oxide (SiOx). The second insulating layer 250 is a member formed in order to prevent a short circuit between the common electrode 270 and the pixel electrode 191 positioned below the support member 365 to be formed below. Accordingly, when the support member 365 is formed so as not to be overlapped with the pixel electrode 191, the forming process of the second insulating layer 250 may be omitted.

Figure 18:
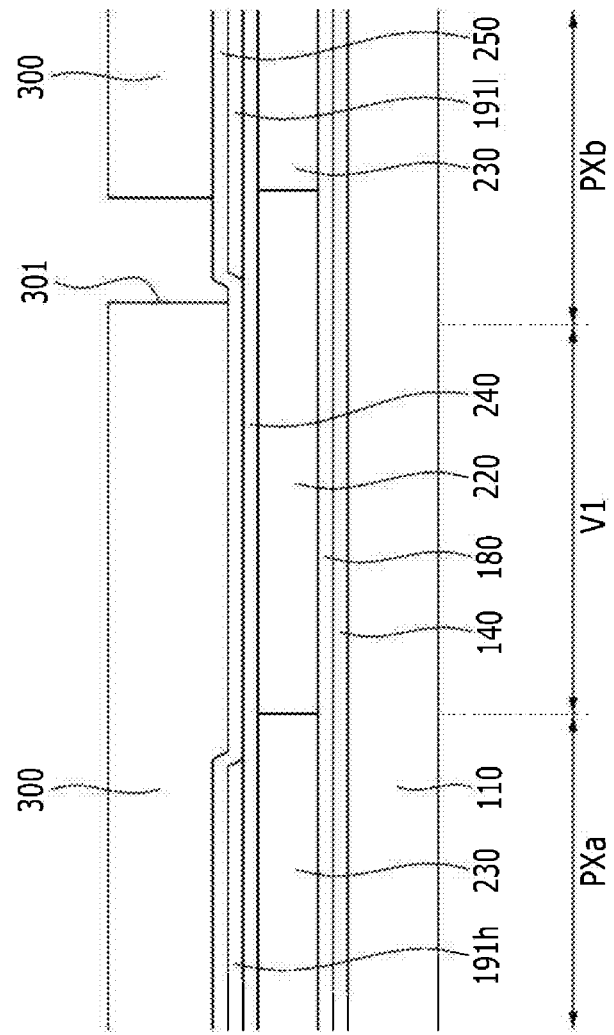

As illustrated in FIG. 18, a sacrificial layer 300 is formed by coating a photosensitive organic material on the pixel electrode 191 and performing a photolithography process.

The sacrificial layers 300 are formed to be connected to each other along the plurality of pixel columns. That is, the sacrificial layer 300 is formed to cover each pixel area PX and to cover the first valley V1 positioned between the first subpixel area PXa and the second subpixel area PXb.

That is, the photosensitive organic material positioned at the second valley V2 is removed through the photolithography process. Further, an opening 301 is formed by removing a partial region of the sacrificial layer 300 through the photolithography process. The opening 301 may be formed to be adjacent to the first valley V1. The second insulating layer 250 positioned below the photosensitive organic material is exposed by forming the opening 301.

Figure 19:
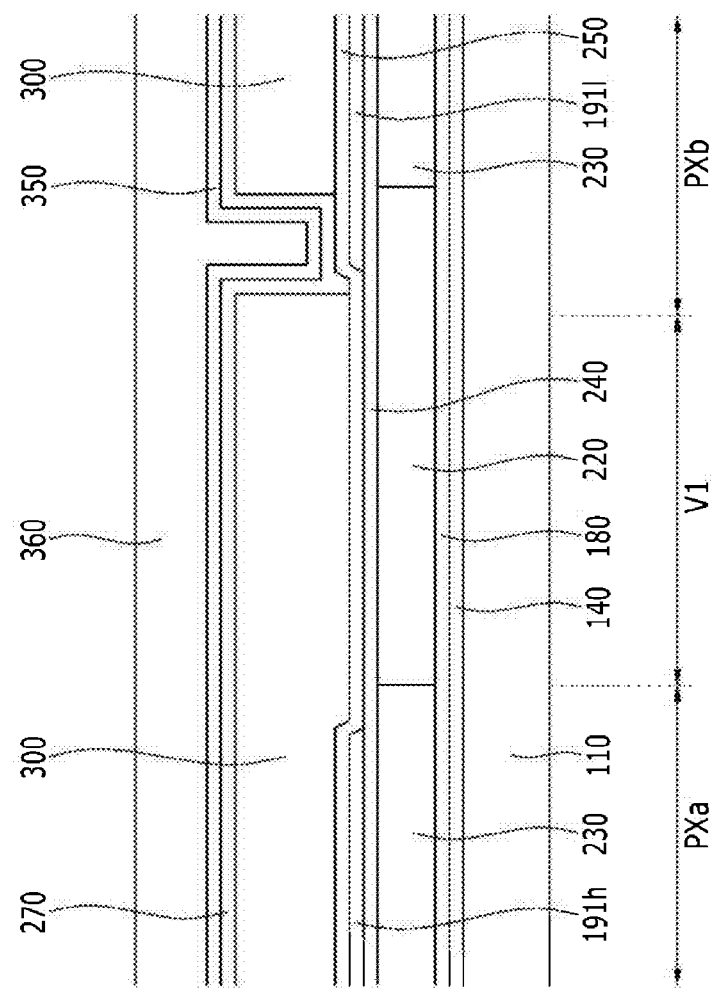

As illustrated in FIG. 19, a common electrode 270 is formed on the sacrificial layer 300 by depositing a transparent metal material such as indium tin oxide (ITO) or indium zinc oxide (IZO).

Next, a third insulating layer 350 may be formed on the common electrode 270 by using an inorganic insulating material such as silicon oxide or silicon nitride.

Next, a roof layer 360 is formed on the third insulating layer 350 with an organic material, and a support member 365 is formed in the opening 301. The roof layer 360 and the support member 365 may be formed by using the same material during the same process. The common electrode 270 and the third insulating layer 350 are positioned below the roof layer 360 and the support member 365.

The support member 365 may be formed to be overlapped with the pixel electrode 191. In this case, since the second insulating layer 250 is formed on the pixel electrode 191, the common electrode 270 positioned below the support member 365 may be prevented from being short-circuited from the pixel electrode 191.

The support member 365 has a column shape, and the planar shape of the support member 365 viewed from the upper side of the substrate 110 may have various shapes such as a circle, a rectangle, a triangle, a trapezoid, a T-lettered shape, a semicircle, a semioval, and a pentagon. As described above, when the support member 365 has a triangle, a trapezoid, a T-lettered shape, a semicircle, a semioval, and a pentagon as compared with a circle and a rectangle, the aperture ratio may be further improved. That is, when the width of the support member 365 is larger as it becomes closer to the first valley V1, since the place where the aggregation phenomenon of the alignment layer occurs is closer to the first valley V1, the aperture ratio may be further improved.

Figure 20:
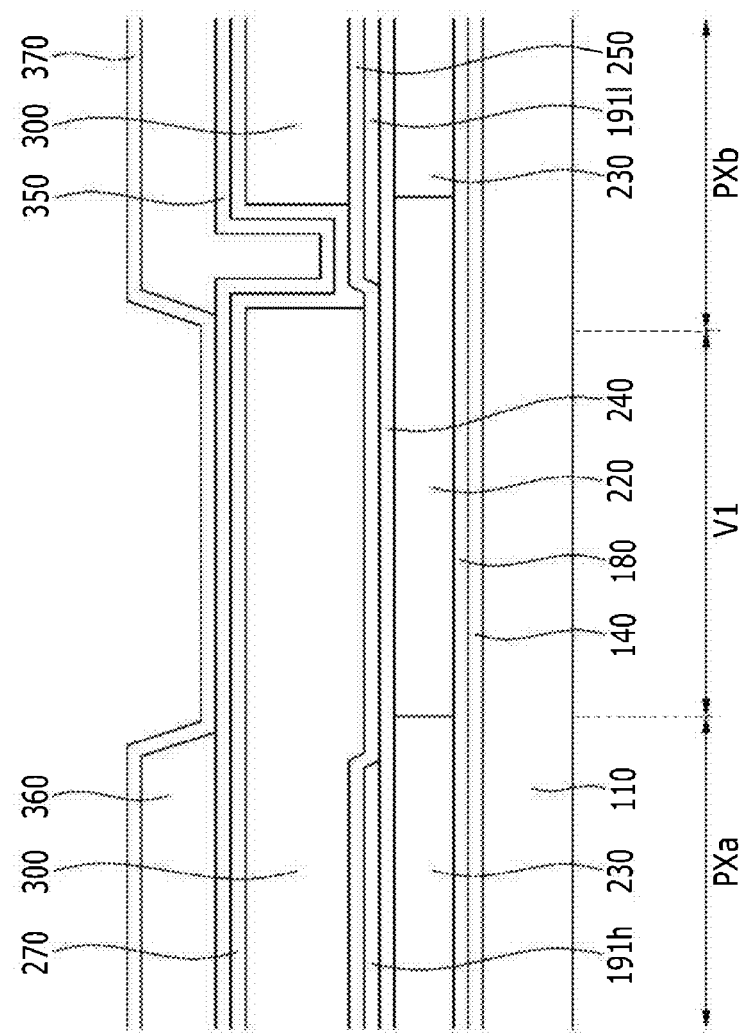

As illustrated in FIG. 20, the roof layer 360 positioned at the first valley V1 may be removed by patterning the roof layer 360. As a result, the roof layers 360 may be formed to be connected to each other along a plurality of pixel rows.

Next, a fourth insulating layer 370 may be formed on the roof layer 360 with an inorganic insulating material such as silicon nitride (SiNx) or silicon oxide (SiOx). The fourth insulating layer 370 is formed on the patterned roof layer 360 to cover and protect the side surface of the roof layer 360.

Figure 21:
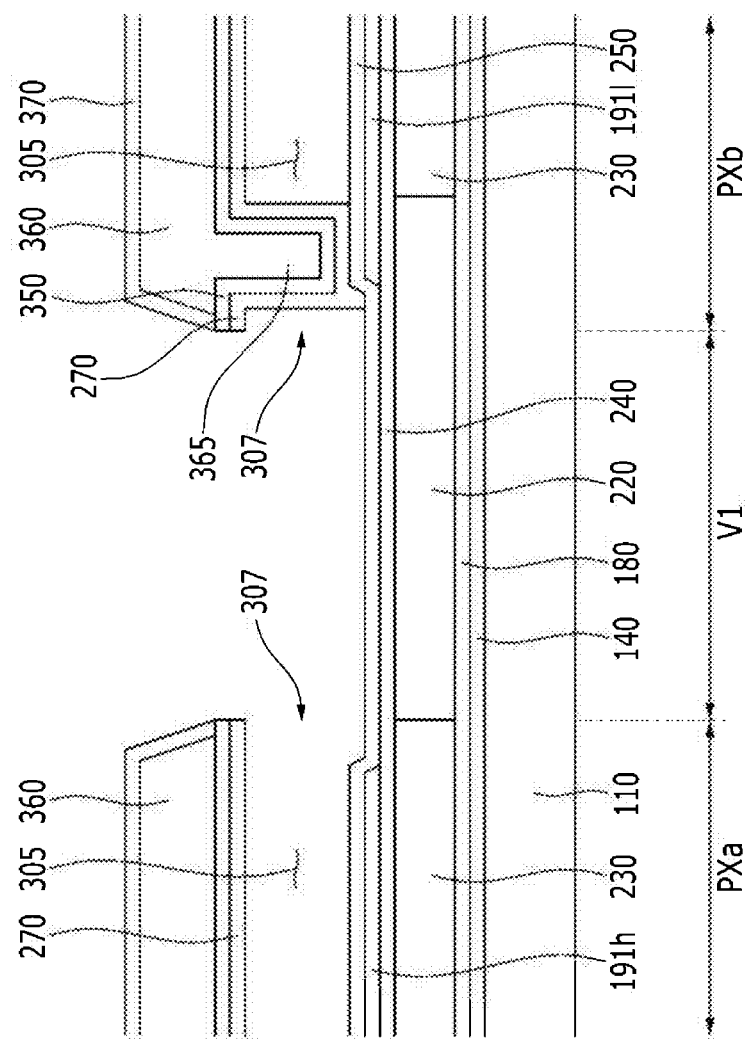

As illustrated in FIG. 21 the fourth insulating layer 370, the third insulating layer 350, and the common electrode 270 which are positioned at the first valley V1 are removed by patterning the fourth insulating layer 370, the third insulating layer 350, and the common electrode 270.

The sacrificial layer 300 positioned at the first valley V1 is exposed outside by patterning the roof layer 360 and the common electrode 270.

Next, the sacrificial layer 300 is fully removed by supplying a developer onto the substrate 110 where the sacrificial layer 300 is exposed, or the sacrificial layer 300 is fully removed by an ashing process.

When the sacrificial layer 300 is removed, the microcavity 305 is generated at a site where the sacrificial layer 300 is positioned.

The pixel electrode 191 and the common electrode 270 are spaced apart from each other with the microcavity 305 therebetween, and the pixel electrode 191 and the roof layer 360 are spaced apart from each other with the microcavity 305 therebetween. The common electrode 270 and the roof layer 360 are formed to cover the top surface and both side surfaces of the microcavity 305.

The microcavity 305 is exposed outside through a portion where the roof layer 360 and the common electrode 270 are removed, which is called an injection hole 307. The injection hole 307 may be formed along the first valley V1. For example, the injection holes 307 may be formed to face each other at the edges of the first subpixel area PXa and the second subpixel area PXb. That is, the injection holes 307 may correspond to a lower side of the first subpixel area PXa and the upper side of the second subpixel area PXb to expose a side surface of the microcavity 305. The injection hole 307 may also be formed along the second valley V2.

Hereinafter, a positional relationship of the injection hole 307 and the support member 365 is described below.

The support member 365 is adjacent to the injection hole 307 to be formed in the microcavity 305. Two injection holes 307 may be formed in one microcavity 305, and the support member 365 is adjacent to one injection hole 307 of the two injection holes 307. The aggregation phenomenon of the alignment layer occurs around the injection hole 307 where the support member 365 is formed, and as described above, the light blocking member 220 is formed to be overlapped with the support member 365 so that the phenomenon is prevented from being recognized as a defect. Since an area of forming the light blocking member 220 may be reduced as the support member 365 is formed to be closer to the injection hole 307, an aperture ratio may be also improved.

A distance between the support member 365 and a side wall of the roof layer 360 is smaller as it becomes closer to the injection hole 307. Accordingly, the capillary force becomes strong as it becomes closer to the injection hole 307, and solids of the aligning agent may be pushed to the injection hole 307 between the support member 365 and the roof layer 360. Therefore, since the place where the aggregation phenomenon of the alignment layer occurs is closer to the injection hole 307, an aperture ratio may be further improved.

A plurality of support members 365 may be formed in one microcavity 305. In this case, a distance between the adjacent support members 365 among the plurality of support members 365 is smaller as it becomes closer to the injection hole 307. Accordingly, the capillary force becomes strong as it becomes closer to the injection hole 307, and solids of the aligning agent may be pushed to the injection hole 307 between the adjacent support members 365. Therefore, since the place where the aggregation phenomenon of the alignment layer occurs is closer to the injection hole 307, an aperture ratio may be further improved.

The distance between the support member 365 and the side wall of the roof layer 360 is smaller as it becomes closer to the injection hole 307, and the distance between the plurality of adjacent support members 365 is smaller as it becomes closer to the injection hole 307, but the present invention is not limited thereto. When a cross section of the microcavity 305 is smaller as it becomes closer to the injection hole 307, the capillary force may be stronger as it becomes closer to the injection hole 307. Accordingly, a height of the microcavity 305 may be smaller as it becomes closer to the injection hole 307. In this case, the width of the support member 365 may be uniformly formed.

Next, the roof layer 360 is cured by applying heat to the substrate 110. This is to maintain the shape of the microcavity 305 by the roof layer 360.

Figure 22:
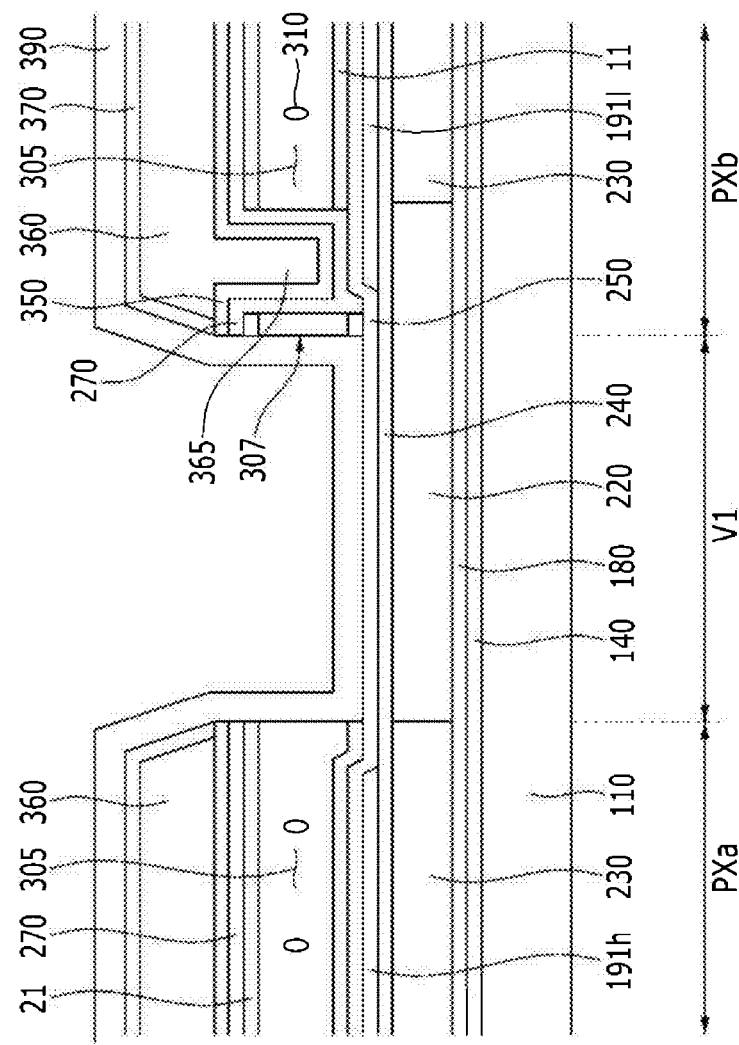

As illustrated in FIG. 22, when an aligning agent containing an alignment material is dropped on the substrate 110 by a spin coating method or an inkjet method, the aligning agent is injected into the microcavity 305 through the injection hole 307. When the aligning agent is injected into the microcavity 305 and then the curing process is performed, a solution component is evaporated and the alignment material remains on an inner wall of the microcavity 305.

Accordingly, the first alignment layer 11 may be formed on the pixel electrode 191, and the second alignment layer 21 may be formed below the common electrode 270. The first alignment layer 11 and the second alignment layer 21 face each other with the microcavity 305 therebetween and are connected to each other at the edge of the pixel area PX.

In this case, the first and second alignment layers 11 and 21 may be aligned in a vertical direction to the substrate 110, except for the side surface of the microcavity 305. In addition, a process of irradiating UV light to the first and second alignment layers 11 and 21 is performed, and as a result, the first and second alignment layers 11 and 21 may be aligned in a horizontal direction to the substrate 110.

Next, when the liquid crystal material constituted by liquid crystal molecules 310 is dropped on the substrate 110 by an inkjet method or a dispensing method, the liquid crystal material is injected into the microcavity 305 through the injection hole 307. The liquid crystal material may be dropped in the injection holes 307 formed along the odd-numbered first valleys V1 and may not be dropped in the injection holes 307 formed along the even-numbered first valleys V1. Alternatively, the liquid crystal material may be dropped in the injection holes 307 formed along the even-numbered first valleys V1 and may not be dropped in the injection holes 307 formed along the odd-numbered first valleys V1.

When the liquid crystal material is dropped in the injection holes 307 formed along the odd-numbered first valleys V1, the liquid crystal material passes through the liquid crystal injection hole 307 by capillary force to be injected into the microcavity 305. In this case, the liquid crystal material is injected into the microcavity 305 well by discharging air in the microcavity 305 through the injection hole 307 formed along the even-numbered first valley V1.

Further, the liquid crystal material may be dropped in all of the injection holes 307. That is, the liquid crystal material may be dropped in the injection holes 307 formed along the odd-numbered first valleys V1 and the injection holes 307 formed along the even-numbered first valleys V1.

Next, an encapsulation layer 390 is formed by depositing a material which does not react with the liquid crystal molecules 310 on the fourth insulating layer 370. The encapsulation layer 390 is formed to cover the injection hole 307 where the microcavity 305 is exposed outside to seal the microcavity 305.

Next, although not illustrated, polarizers may be further attached the upper and lower sides of the display device. The polarizers may be configured by a first polarizer and a second polarizer. The first polarizer may be attached onto the lower surface of the substrate 110, and the second polarizer may be attached onto the encapsulation layer 390.

While this invention has been described in connection with certain embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 11: First alignment layer | 21: Second alignment layer |
| 110: Substrate | 121: Gate line |
| 123: Step-down gate line | 124h: First gate electrode |
| 124l: Second gate electrode | 124c: Third gate electrode |
| 131: Storage electrode line | 140: Gate insulating layer |
| 154h: First semiconductor | 154l: Second semiconductor |
| 154c: Third semiconductor | 171: Data line |
| 173h: First source electrode | 173l: Second source electrode |
| 173c: Third source electrode | 175h: First drain electrode |
| 175l: Second drain electrode | 175c: Third drain electrode |
| 180: Passivation layer | 191: Pixel electrode |
| 191h: First subpixel electrode | 191l: Second subpixel electrode |
| 220: Light blocking member | 230: Color filter |
| 240: First insulating layer | 250: Second insulating layer |
| 270: Common electrode | 300: Sacrificial layer |
| 305: Microcavity | 307: Injection hole |
| 310: Liquid crystal molecule | 350: Third insulating layer |
| 360: Roof layer | 365: Support member |
| 370: Fourth insulating layer | 390: Encapsulation layer |

What is claimed is:

1. A display device, comprising:
a substrate;
a thin film transistor disposed on the substrate;
a pixel electrode connected to the thin film transistor;
a roof layer disposed on the pixel electrode to be spaced apart from the pixel electrode by a plurality of microcavities therebetween;
a liquid crystal layer disposed in the plurality of microcavities;
an encapsulation layer disposed on the roof layer, the encapsulation layer comprising a contact portion contacting the liquid crystal layer; and
at least one support member disposed adjacent to the contact portion in at least one microcavity in the plurality of microcavities;
wherein a cross sectional area of the microcavities decreases in a direction towards the contact portion.

2. The display device of claim 1, wherein:
a distance between the at least one support member and a side wall of the roof layer decreases in a direction towards the contact portion.

3. The display device of claim 2, wherein:
a plurality of the support members are adjacent to the contact portion.

4. The display device of claim 3, wherein:
a distance between the plurality of adjacent support members decreases in a direction towards the contact portion.

5. The display device of claim 1, wherein:
a width of the at least one support member increases in a direction towards the contact portion.

6. The display device of claim 1, wherein:
the at least one support member has a column shape, and a planar shape of the at least one support member comprises a triangle, a trapezoid, a T-lettered shape, a semicircle, a semioval, or a pentagon.

7. The display device of claim 1, wherein:
the at least one support member is overlapped with the pixel electrode.

8. The display device of claim 7, further comprising:
an insulating layer formed between the at least one support member and the pixel electrode.

9. The display device of claim 1, wherein:
the at least one support member is not overlapped with the pixel electrode.

10. The display device of claim 1, further comprising:
a light blocking member formed on the substrate to be overlapped with a boundary of the pixel area, the thin film transistor, and the at least one support member.

11. The display device of claim 1, wherein:
a height of the at least one microcavity decreases in a direction towards the contact portion.

12. A display device, comprising:
a substrate;
a thin film transistor disposed on the substrate;
a pixel electrode connected to the thin film transistor;
a roof layer disposed on the pixel electrode to be spaced apart from the pixel electrode by a plurality of microcavities therebetween;
a liquid crystal layer disposed in the plurality of microcavities;
an encapsulation layer disposed on the roof layer, the encapsulation layer comprising a contact portion contacting the liquid crystal layer, and
at least one support member disposed adjacent the contact portion in at least one microcavity of the plurality of microcavities,
wherein a width of the at least one support member increases in a direction towards the contact portion.

13. The display device of claim 12, wherein:
a distance between the at least one support member and a side wall of the roof layer decreases in a direction towards the contact portion.

14. The display device of claim 12, wherein:
a plurality of the support members are adjacent to the contact portion.

15. The display device of claim 14, wherein:
a distance between the plurality of adjacent support members decreases in a direction towards the contact portion.

16. The display device of claim 12, wherein:
the at least one support member has a column shape, and a planar shape of the at least one support member comprises a triangle, a trapezoid, a T-lettered shape, a semicircle, a semioval, or a pentagon.

* * * * *